United States Patent
Chu et al.

(10) Patent No.: US 9,600,904 B2
(45) Date of Patent: Mar. 21, 2017

(54) ILLUMINATING A VIRTUAL ENVIRONMENT WITH CAMERA LIGHT DATA

(71) Applicant: Samsung Electronics Co., Ltd., Suwon-si, Gyeonggi-do (KR)

(72) Inventors: Alexander Gregory Chu, Dallas, TX (US); Joseph Luke Marshall, Richardson, TX (US); Andrew Joseph Dickerson, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 212 days.

(21) Appl. No.: 14/143,784

(22) Filed: Dec. 30, 2013

(65) Prior Publication Data

US 2015/0187093 A1 Jul. 2, 2015

(51) Int. Cl.
  G06T 11/00 (2006.01)
  G06T 15/50 (2011.01)
  G06T 19/20 (2011.01)
  H04N 5/58 (2006.01)
  H04N 21/485 (2011.01)
  G09G 5/00 (2006.01)

(52) U.S. Cl.
  CPC .......... *G06T 11/001* (2013.01); *G06T 15/506* (2013.01); *G06T 19/20* (2013.01); *G09G 5/00* (2013.01); *H04N 5/58* (2013.01); *H04N 21/4854* (2013.01); *G06T 2207/10024* (2013.01); *G06T 2215/16* (2013.01); *G09G 2340/14* (2013.01); *G09G 2360/144* (2013.01)

(58) Field of Classification Search
  USPC .................. 345/419, 426, 632, 633
  See application file for complete search history.

(56) References Cited

U.S. PATENT DOCUMENTS

| | | | |
|---|---|---|---|
| 6,685,326 B2 | 2/2004 | Debevee et al. | |
| 6,983,082 B2 | 1/2006 | Duiker | |
| 7,330,584 B2 | 2/2008 | Weiguo et al. | |
| 8,860,843 B2 * | 10/2014 | Mate | 348/224.1 |
| 8,922,672 B2 * | 12/2014 | Mahowald | H04N 5/23232 348/223.1 |
| 8,933,965 B2 * | 1/2015 | Tomite | G06T 15/50 345/633 |
| 9,107,608 B2 * | 8/2015 | Zhou | A61B 3/1015 |
| 2003/0202120 A1 | 10/2003 | Mack | |
| 2007/0091111 A1 * | 4/2007 | Gutta | H04N 5/58 345/591 |
| 2007/0236485 A1 * | 10/2007 | Trepte | G06T 15/60 345/207 |
| 2009/0033801 A1 * | 2/2009 | Gutta | H04N 9/73 348/708 |

(Continued)

*Primary Examiner* — Kimbinh T Nguyen
(74) *Attorney, Agent, or Firm* — Jefferson IP Law, LLP (57) ABSTRACT

A method for operating a list in a mobile terminal is disclosed. An example method includes receiving a scene to display corresponding to a user performing an operation on the mobile terminal, capturing an image of the current environment from a camera of the mobile terminal while the user is performing the operation, extracting information from the captured image, processing the extracted information, rendering a display screen according to the received scene and according to the extracted information, and displaying the rendered display screen during the operation.

18 Claims, 5 Drawing Sheets

(56) References Cited

U.S. PATENT DOCUMENTS

| | | | |
|---|---|---|---|
| 2009/0175536 A1* | 7/2009 | Gutta | H04N 9/73 |
| | | | 382/166 |
| 2010/0265385 A1 | 10/2010 | Knight et al. | |
| 2010/0315423 A1 | 12/2010 | Ahn et al. | |
| 2012/0008854 A1 | 1/2012 | Shim | |
| 2012/0099012 A1* | 4/2012 | Ryu | H04N 5/23293 |
| | | | 348/333.01 |
| 2012/0262571 A1* | 10/2012 | Wang | H04N 5/2354 |
| | | | 348/135 |
| 2013/0273968 A1* | 10/2013 | Rhoads | G06F 17/30244 |
| | | | 455/556.1 |

\* cited by examiner

ILLUMINATING A VIRTUAL ENVIRONMENT WITH CAMERA LIGHT DATA

BACKGROUND

Mobile terminals such as portable media players, smartphones, tablet Personal Computers (PCs), and similar devices have increased in use due to enhanced wireless network connectivity and low power functionality. Further, mobile terminals generally include multiple cameras and multiple sensors for immersive experiences such as a video phone function.

It is also common that mobile terminals include applications to serve auxiliary purposes such as an electronic book reader, a navigation service, a game functionality, a music player, a video player, and so forth. However, because the screen also receives touch input to perform various functions, the user interface experience may be non-intuitive and the user may not feel connected because the applications are merely images that are displayed. Accordingly, the user experience of operating the mobile terminal may be less than satisfactory.

The above information is presented as background information only to assist with an understanding of the present disclosure. No determination has been made, and no assertion is made, as to whether any of the above might be applicable as prior art with regard to the present invention.

SUMMARY

Aspects of the present invention are to address at least the above-mentioned problems and/or disadvantages and to provide at least the advantages described below. Accordingly, an aspect of the present invention is to provide a method of illuminating a virtual environment with a camera light.

In accordance with an aspect of the present invention, a method for generating a display screen in a mobile terminal is provided. The method includes receiving a scene to display corresponding to a user performing an operation on the mobile terminal, capturing an image of the current environment from a camera of the mobile terminal while the user is performing the operation, extracting information from the captured image, processing the extracted information, rendering a display screen according to the received scene and according to the extracted information, and displaying the rendered display screen during the operation.

In accordance with another aspect of the present invention, there is a method for generating a display screen in a mobile terminal is provided. The method includes a processor configured to receiving a scene to display corresponding to a user performing an operation on the mobile terminal, a camera configured to capture an image of the current environment from a camera of the mobile terminal while the user is performing the operation, and a display to display a rendered display screen, wherein the processor extracts information from the captured image, processes the extracted information, and renders the display screen according to the received scene and according to the extracted information.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Furthermore, FIGS. 1 though 5D, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged portable electronic device. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
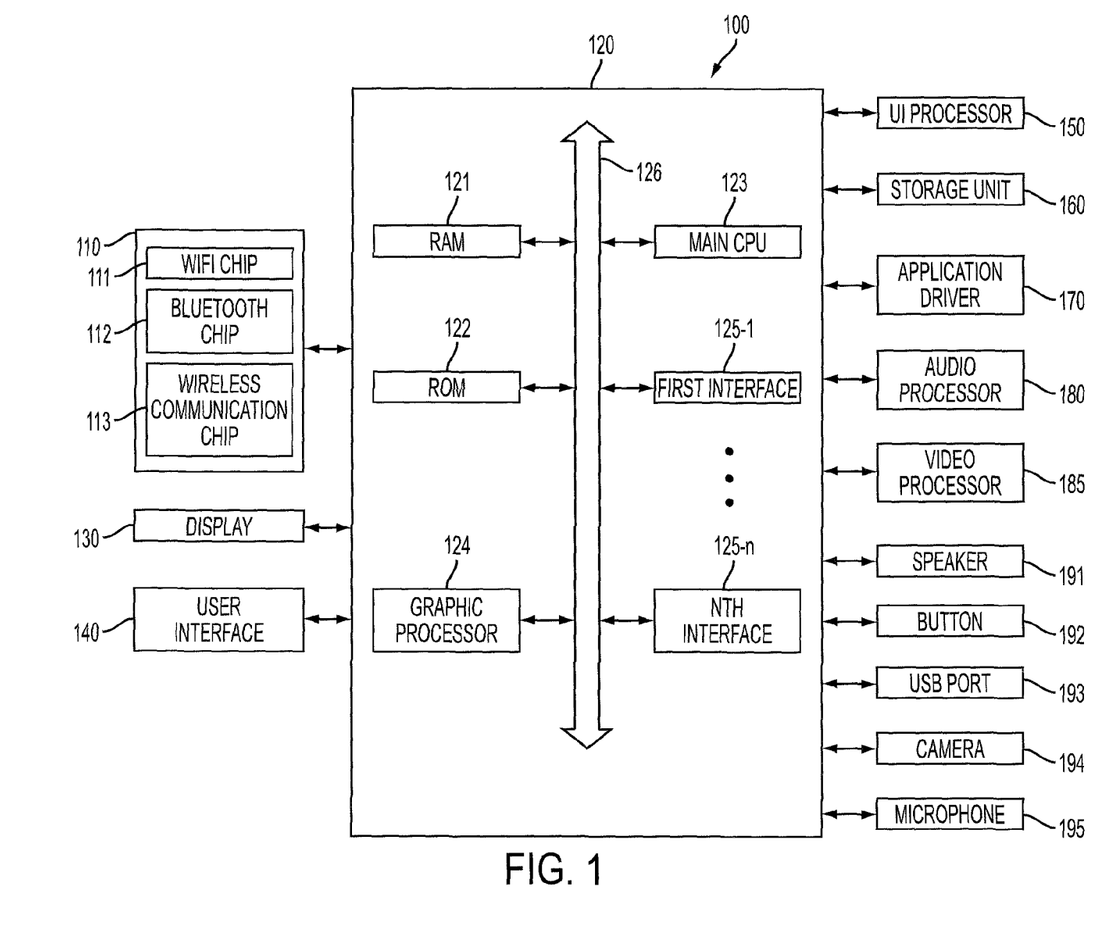
FIG. 1 is a block diagram of a mobile terminal according to an embodiment of the present disclosure.

FIG. 1 is a block diagram of the terminal device according to an embodiment of the present disclosure.

Referring to FIG. 1, the terminal device 100 includes a communication device 110, the controller 120, the display 130, a user interface 140, a storage unit 160, an application driver 170, an audio processor 180, a video processor 185, a speaker 191, an interface unit 192, a USB port 193, a camera 194, and a microphone 195.

The communication device 110 performs communication functions with various types of external apparatuses. The communicator device 110 may include various communication devices such as a Wireless Fidelity (WiFi) device 111, a Bluetooth® device 112, a wireless communication device 113, and so forth. The WiFi device 111 and the Bluetooth device 112 perform communication according to a WiFi standard and a Bluetooth® standard, respectively. The wireless communication 113 device performs communication according to various communication standards such as Zigbee®, 3rd Generation (3G), 3rd Generation Partnership Project (3GPP), Long Term Evolution (LTE), and so forth. In addition, the communication device 110 may further include an Near Field Communication (NFC) device that operates according to a NFC method by using bandwidth from various Radio Frequency-IDentification (RF-ID) frequency bands such as 135 kHz, 13.56 MHz, 433 MHz, 860~960 MHz, 2.45 GHz, and so on.

The operation of the controller 120 reads a computer readable medium and performs instructions according to the computer readable medium, which is stored in the storage unit 160. The storage unit 160 may also store various data such as Operating System (O/S) software, applications, multimedia content (e.g., video files, music files, etc.), user data (documents, settings, etc.), and so forth.

Other software modules which are stored in the storage unit 160 will be described later with reference to FIG. 2.

The user interface 140 is an input device configured to receive user input and transmit a user command corresponding to the user input to the controller 120. For example, the user interface 140 may be implemented by any suitable input such as touch pad, a key pad including various function keys, number keys, special keys, text keys, or a touch screen, for example. Accordingly, the user interface 140 receives various user commands to operate applications and other functions.

The UI processor 150 may generate various types of Graphical UIs (GUIs). Specifically, the UI processor 150 may process and generate various UI screens in 2D or 3D form. Generally, the UI screen may be a screen which is associated with the execution of an application such as a calculator, for example. In addition, the UI screen may be a screen which displays text or diagrams such as a menu screen, a warning sentence, a time, a channel number, etc.

Further, the UI processor 150 may perform operations such as 2D/3D conversion of UI elements, adjustment of transparency, color, size, shape, and location, highlights, animation effects, and so forth.

The storage unit 160 is a storage medium that stores various computer readable mediums that are configured to operate the terminal device 100, and may be realized by any suitable storage device such as a Hard Disk Drive (HDD), a flash memory module, and so forth. For example, the storage unit 160 may comprise a Read Only Memory (ROM) for storing programs to perform operations of the controller 120, a Random Access Memory (RAM) 121 for temporarily storing data of the controller 120, and so forth. In addition, the storage unit 160 may further comprise Electrically Erasable and Programmable ROM (EEPROM) for storing various reference data.

The application driver 170 executes applications that may be provided by the terminal device 100. Such applications are executable and perform user desired functions such as playback of multimedia content, messaging functions, communication functions, display of data retrieved from a network, and so forth.

The audio processor 180 is configured to process audio data for input and output of the terminal device 100. For example, the audio processor 180 may decode data for playback, filter audio data for playback, encode data for transmission, and so forth.

The video processor 185 is configured to process video data for input and output of the terminal device 100. For example, the video processor 185 may decode video data for playback, scale video data for presentation, filter noise, convert frame rates and/or resolution, encode video data input, and so forth.

The speaker 191 is provided to output audio data processed by the audio processor 180 such as alarm sounds, voice messages, audio content from multimedia, audio content from digital files, and audio provided from applications, and so forth.

The interface unit 192 may be configured based on the terminal device 100 and include any suitable input mechanism such as a mechanical button, a touch pad, a wheel, and so forth. The interface unit 192 is generally on a particular position of the terminal device 100, such as on the front, side, or rear of the external surface of the main body. For example, a button to turn the terminal device 100 on and off may be provided on a side.

The USB port 193 may perform communication with various external apparatuses through a USB cable or perform recharging. In other examples, suitable ports may be included to connect to external devices such as an 802.11 Ethernet port, a proprietary connector, or any suitable connector associated with a standard to exchange information.

The camera 194 may be configured to capture (i.e., photograph) an image as a photograph or as a video file (i.e., movie). The camera 194 may include any suitable number of cameras in any suitable location. For example, the terminal device 100 may include a front camera and rear camera.

The microphone 195 receives a user voice or other sounds and converts the same to audio data. The controller 120 may use a user voice input through the microphone 195 during an audio or a video call, or may convert the user voice into audio data and store the same in the storage unit 160.

When the camera 194 and the microphone 195 are provided, the controller 120 may receive based on a speech input into the microphone 195 or a user motion recognized by the camera 194. Accordingly, the terminal device 100 may operate in a motion control mode or a voice control mode. When the terminal device 100 operates in the motion control mode, the controller 120 captures images of a user by activating the camera 194, determines if a particular user motion is input, and performs an operation according to the input user motion. When the terminal device 100 operates in the voice control mode, the controller 120 analyzes the audio input through the microphone and performs a control operation according to the analyzed audio.

In addition, various external input ports are provided to connect to various external terminals such as a headset, a mouse, a Local Area Network (LAN), etc., may be further included.

Generally, the controller 120 controls overall operations of the terminal device 100 using various computer readable mediums that are stored in the storage unit 160. The controller 120 may also control the terminal device 100 via computer readable mediums that are received through the communication device 110 and not stored in the storage unit 160 for, for example, security reasons.

For example, the controller 120 may initiate an application stored in the storage unit 160, and execute the application by displaying a user interface to interact with the application. In other examples, the controller 120 may play back media content stored in the storage unit 160 and may communicate with external apparatuses via the communication device 110.

Specifically, the controller 120 comprises a RAM 121, a ROM 122, a main CPU 123, a graphic processor 124, a first to nth interfaces 125-1~125-n, and a bus 126. In some examples, the components of the controller 120 may be integral in a single packaged integrated circuit. In other examples, the components may be implemented in discrete devices (e.g., the graphic processor 124 may be a separate device).

The RAM 121, the ROM 122, the main CPU 123, the graphic processor 124, and the first to nth interfaces 125-1-125-n may be connected to each other through a bus 126.

The first to nth interfaces 125-1-125-n are connected to the above-described various components. One of the interfaces may be a network interface which is connected to an external apparatus via the network.

The main CPU 123 accesses the storage unit 160 and to initiate a booting process to execute the O/S stored in the storage unit 160. After booting the O/S, the main CPU 123 is configured to perform operations according to software modules, contents, and data stored in the storage unit 160.

The ROM 122 stores a set of commands for system booting. If a turn-on command is input and power is supplied, the main CPU 123 copies an O/S stored in the storage unit 160 onto the RAM 121 and boots a system to execute the O/S. Once the booting is completed, the main CPU 123 may copy application programs in the storage unit 160 onto the RAM 121 and execute the application programs.

The graphic processor 124 is configured to generate a screen including objects such as, for example an icon, an image, and text using a computing unit (not shown) and a rendering unit (not shown). The computing unit computes property values such as coordinates, shape, size, and color of each object to be displayed according to the layout of the screen using input from the user. The rendering unit generates a screen with various layouts including objects based on the property values computed by the computing unit. The screen generated by the rendering unit is displayed by the display 130.

Albeit not illustrated in the drawing, the terminal device 100 may further comprise a sensor (not shown) configured to sense various manipulations such as touch, rotation, tilt, pressure, approach, etc. with respect to the terminal device 100. In particular, the sensor (not shown) may include a touch sensor that senses a touch that may be realized as a capacitive or resistive sensor. The capacitive sensor calculates a touch coordinates by sensing micro-electricity provided when the user touches the surface of the display 130, which includes a dielectric coated on the surface of the display 130. The resistive sensor comprises two electrode plates that contact each other when a user touches the screen, thereby allowing electric current to flow to calculate the touch coordinates. As such, a touch sensor may be realized in various forms. In addition, the sensor may further include additional sensors such as an orientation sensor to sense a rotation of the terminal device 100 and an acceleration sensor to sense displacement of the terminal device 100.

FIG. 1 illustrates an example of specific elements included in the terminal device 100. However, components the terminal device 100 may be added, omitted, or changed according to the configuration of terminal device. For example, a Global Positioning System (GPS) receiver (not shown) to receive a GPS signal from GPS satellite and calculate the current location of the terminal device 100, a Magnetic Compass to detect orientation with respect to the Earth's magnetic field, and a Digital Multimedia Broadcasting (DMB) receiver (not shown) to receive and process a DMB signal may be further included.

Figure 2:
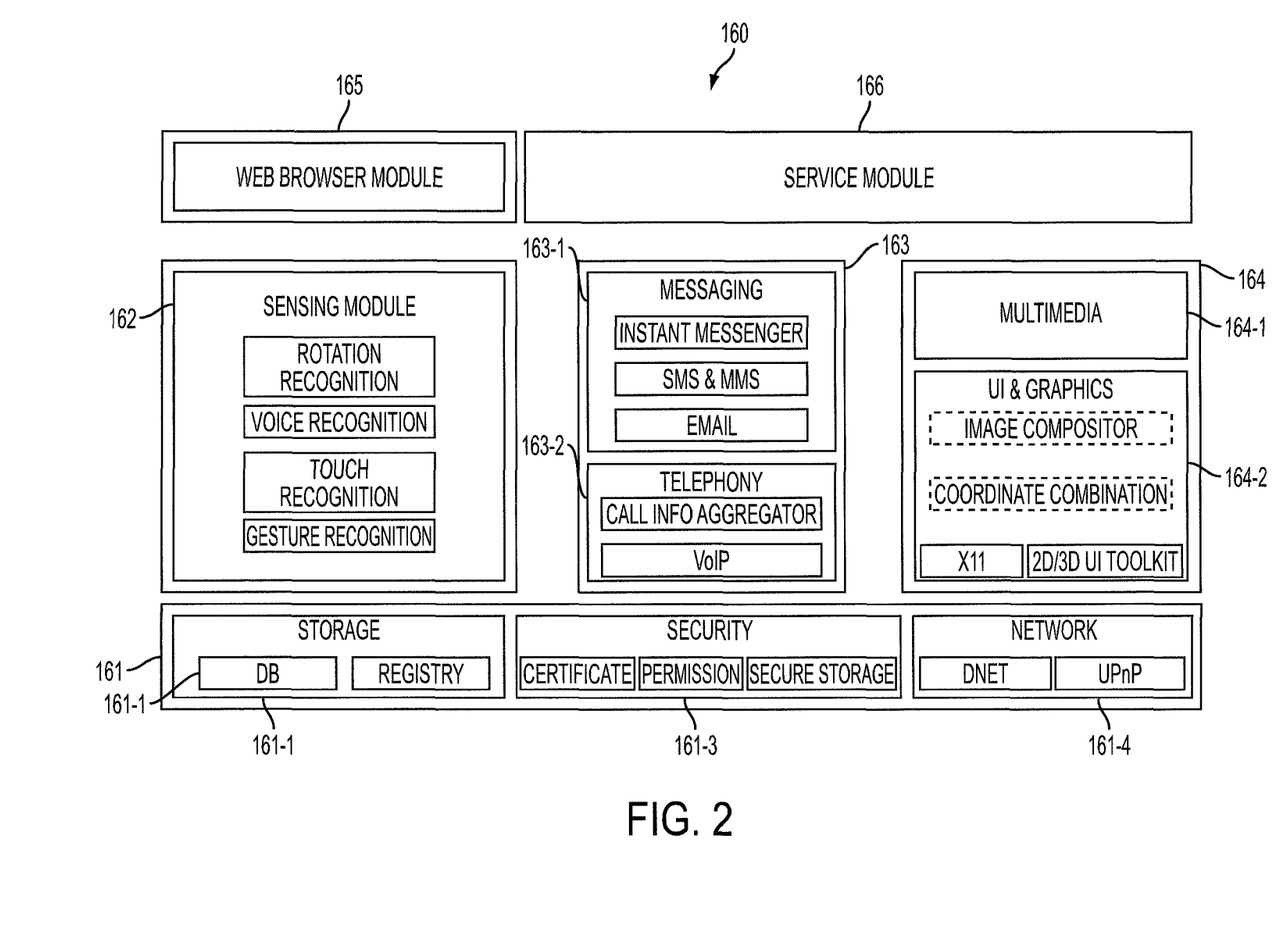
FIG. 2 is a block diagram of software modules in a storage unit 160 according to an embodiment of the present disclosure.

FIG. 2 is a block diagram of software modules in a storage unit 160 according to an embodiment of the present disclosure.

Referring to FIG. 2, the storage unit 160 may store software including a base module 161, a sensing module 162, a communication module 163, a presentation module 164, a web browser module 165, and a service module 166.

The base module 161 refers to a basic module which processes a signal transmitted from hardware included in the terminal device 100 and transmits the processed signal to an upper layer module. The base module 161 includes a storage module 161-1, a security module 161-2, and a network module 161-4. The storage module 161-1 is a program module including database or registry. The main CPU 123 may access a database in the storage unit 160 using the storage module 161-1 to read out various data. The security module 161-2 is a program module which supports certification, permission, secure storage, etc. with respect to hardware, and the network module 161-4 is a module which supports network connections, and includes a DNET module, a Universal Plug and Play (UPnP) module, and so forth.

The sensing module 162 collects information from various sensors, analyzes the collected information, and manages the collected information. The sensing module 162 may include suitable modules such as a face recognition module, a voice recognition module, a touch recognition module, a motion recognition (i.e., gesture recognition) module, a rotation recognition module, and an NFC recognition module, and so forth.

The communication module 163 performs communication with other devices. The communication module 163 may include any suitable module according to the configuration of the terminal device 100 such as a messaging module 163-1 (e.g., a messaging application), a Short Message Service (SMS) & a Multimedia Message Service (MMS) module, an e-mail module, etc., and a call module 163-2 that includes a call information aggregator program module (e.g., a VoIP module), and so forth.

The presentation module 164 composes an image to display on the display 130. The presentation module 164 includes suitable modules such as a multimedia module 164-1 and a UI rendering module 164-2. The multimedia module 164-1 may include suitable modules for generating and reproducing various multimedia contents, screens, and sounds. For example, the multimedia module 164-1 includes a player module, a camcorder module, a sound processing module, and so forth. The UI rendering module 164-2 may include an image compositor module for combining images, a coordinates combination module for combining and generating coordinates on the screen where an image is to be displayed, an X11 module for receiving various events from hardware, a 2D/3D UI toolkit for providing a tool for composing a UI in 2D or 3D form, and so forth. Further, the UI rendering module 164-2 may use external conditions such as the user environment to generate the image to be displayed.

The web browser module 165 accesses a web server to retrieve data and displays the retrieved data in response to a user input. The web browser module 165 may also be configured to transmit user input to the web server. The web browser module 165 may include suitable modules such as a web view module for composing a web page according to the markup language, a download agent module for downloading data, a bookmark module, a web-kit module, and so forth.

The service module 166 is a module including applications for providing various services. Specifically, the service module 166 may include program modules such as a navigation program, a content reproduction program, a game program, an electronic book program, a calendar program, an alarm management program, other widgets, and so forth.

FIG. 2 illustrates various program modules, but some of the various program modules may be omitted, changed, or added according to the configuration of the terminal device 100. For example, a location-based module which supports a location-based service in association with hardware such as a GPS receiver may be further included.

Figure 3:
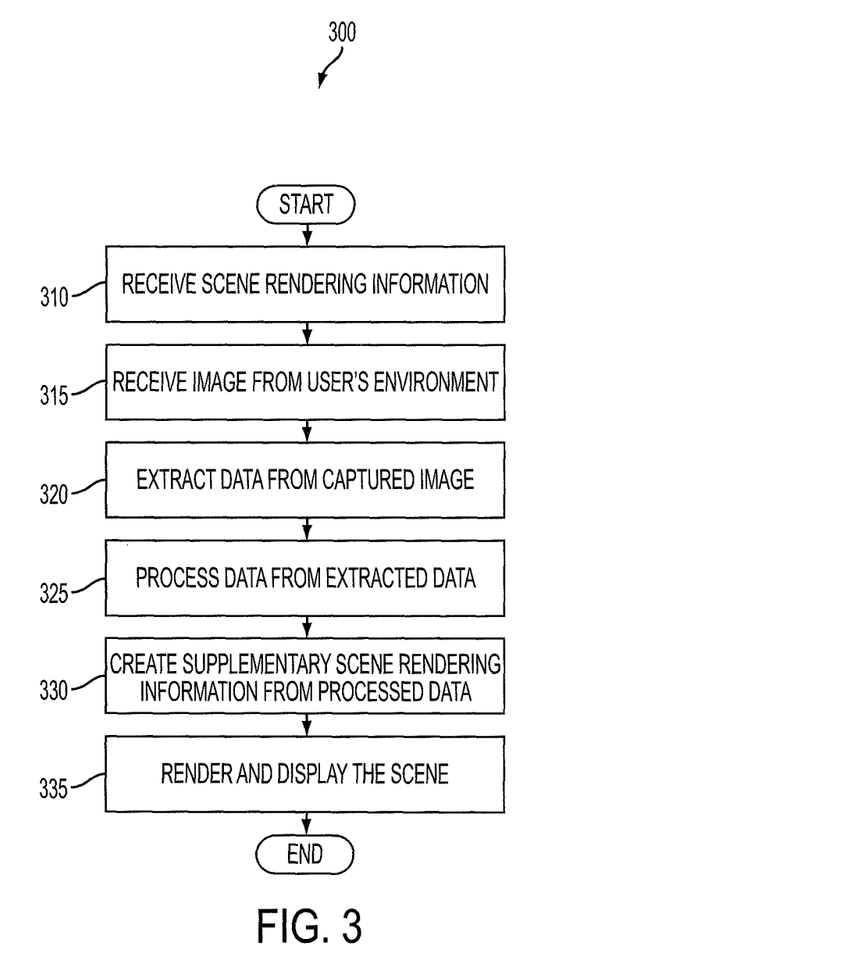
FIG. 3 is a flowchart illustrating a display method based on the user environment according to an embodiment of the present disclosure.

FIG. 3 is a flowchart illustrating a display method based on the user environment according to an embodiment of the present disclosure.

Referring to FIG. 3, an example method 300 is provided for receiving auxiliary input and rendering a scene in a mobile terminal. For example, the example method 300 may be used to generate a 3D user interface that more naturally immerses the user in the application by providing visual feedback according to the user's environment, thereby matching the actual user's environment.

The example method 300 may also be used for any other scene rendering in the mobile terminal. For example, the example method 300 may be implemented in a video game, a video call application, a home screen of a mobile terminal, and so forth. The example method 300 is performed substantially in real time to provide visual feedback to the user based on the user's environmental conditions. In this example, the feedback is provided via a front facing camera and/or a back facing camera, but any suitable number and combination of cameras, sensors, and additional inputs or auxiliary data related to the user's environment may be used to detect the user's environment.

Initially, at operation 310, the example method 300 receives scene rendering information. The scene rendering information elements that are specified according to the state of the mobile terminal and elements according to the application. For example, if a mobile terminal is executing a calculator application, the scene rendering information may include a 3D model of the calculator that is used to render the calculator for display. In other examples, the 3D model may be a complex 3D model or may be a pseudo 3D geometry that presents elements at different heights. In a pseudo 3D geometry, different heights are specified for different elements in 2D form such as, for example, buttons on the calculator application to thereby reduce the computation required to render the scene.

The scene rendering information can also include various graphical properties. For example, the calculator application may include texture maps, bump maps, light sources, and other graphical properties that are used to create the scene according to the user's current environment.

At operation 315, the mobile device receives an image from the user's environment. For example, a front facing camera that a user faces in a video call may capture an image of the user's environment. However, a camera from the back that faces away from the user during the operation may also be used.

At operation 320, data from the captured image is extracted to provide information of the user's environment. For example, the operation 320 may extract a luminance channel, which represents the greyscale light value of a Red Green Blue (RGB) pixel according to the Hue/Saturation/Lightness model, from the captured image. That is, an image representing the luminance is extracted from the captured image.

At operation 325, the example method 300 processes the extracted data for later use. For example, using the luminance image the operation 320, the example method 300 may generate a brightness map corresponding to the luminance of the captured image by dividing the image into an array (e.g., a five by ten array). An average luminance for each cell in the array is computed to create a luminance map. As will be described later, the luminance map will be used to create ambient lights in the scene to render the scene as if it was present in the user's current environment.

In other examples, the operation 325 may identify a light source in the captured image by using a combination of the processed image and the extracted data from the captured image. For example, if the captured image includes a bright spot due a light source such as the sun or a floor lamp, a light source may be determined to be in the user's environment.

Although the example describes a luminance map, any suitable image process may be implemented to facilitate creation of immersive user interfaces. Further, the luminance is just one example and any suitable type of image information may be used to facilitate an immersive user interface. For example, the color temperature can be processed, light diffusion may be calculated, auxiliary information (e.g., time, weather, location, season, etc.) may be used to generate the user interface, and so forth.

At operation 330, the processed data is used to create supplementary scene rendering information. For example, the luminance map may be used to create ambient lights that will be used to render a scene in the user interface. Specifically, each cell in the array is provided an ambient light source that is used to render the scene such that the scene mimics the current environment of the user. Further, if the light source was created due to a bright spot in the image, a light source corresponding to the bright spot in the image is created in the supplementary scene rendering information. The light source includes various details to mimic the bright spot in the image such as light intensity, distance that the light source is from the scene, location of the light source, color temperature of the light source, and any other graphical properties.

At operation 335, the scene rendering information and the supplementary scene rendering information is used to render and display the rendered scene at operation 350. That is, the example method 300 receives external environmental conditions via an image, processes the image, and renders a scene based on the processed image. In the example of the calculator application, the 3D elements such as buttons will cast a shadow according to the light source. Further, the buttons appearance will change based on the ambient light and the spot light. Thus, the luminance information may be extracted to render a 3D calculator such that it appears more realistic to enhance the user interface.

For example, if a light was placed in a fixed position while pointing at the mobile terminal as it rotates, the buttons cast shadows in the rendered scene according to the position of the light with respect to the mobile terminal Thus, moving the light over the mobile terminal would be reflected in the rendered calculator to create the impression that it is three dimensional. Further, the ambient light as applied to the scene also affects the scene rendering, but the effect is subtle by creating small variations to make the rendered scene more realistic.

In another example, the scene may be rendered using the captured image. For example, if the scene includes a metallic object that reflects light, the image may be applied to the scene rendering via a rendering map. Using the captured image, the rendering map applies the captured image, or a processed version of the captured image, to the scene to create the impression that the user's environment is reflected in the scene. For example, if the scene to be rendered includes a stainless steel teapot, the captured image may be processed to reduce the color gamut based on the surface of the teapot and then rendered onto the teapot to create an impression that the teapot is real.

Figure 4A:
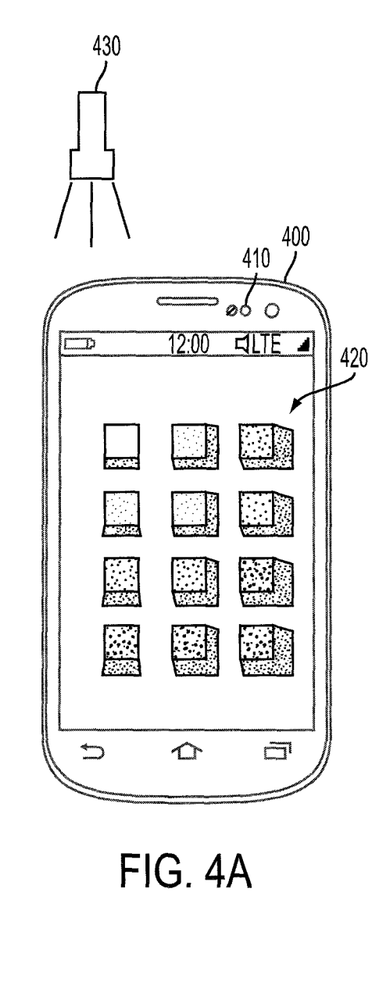
FIGS. 4A and 4B are illustrations of an implementation of the example process of FIG. 3 according to an embodiment of the present disclosure.
Figure 4B:
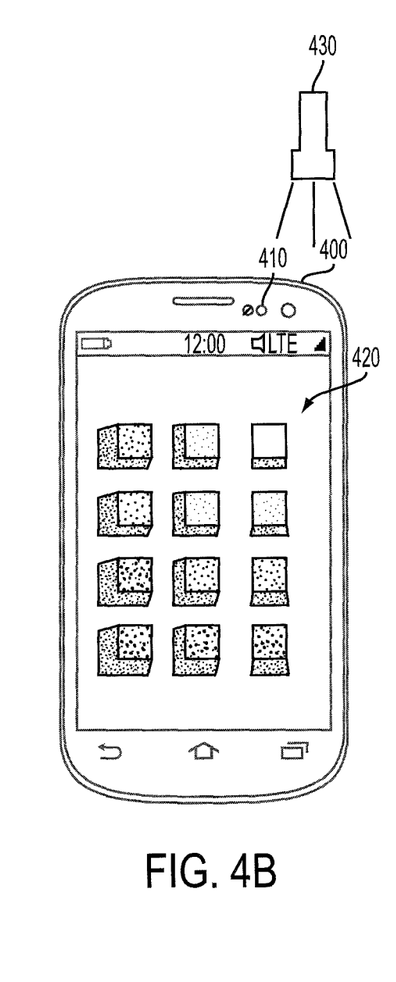

FIGS. 4A and 4B are illustrations of an implementation of the example process of FIG. 3.

Referring to FIGS. 4A and 4B, a mobile terminal 400 is executing an application on a display. The application displays 3D elements based on the user environment that is received via a camera 410. For example, application includes 3D elements 420 that each represent identical three dimensional boxes located on a plane and a shadow will be cast onto the plane based upon the current light conditions in the user's environment. The 3D elements 420 can include additional graphical properties such as a texture map to simulate a texture of an object (e.g., leather, wood, etc.), a light source (e.g., a mechanical button that includes a Light Emitting Diode (LED), etc.), various particles elements and volumetric effects (e.g., smoke, fire, etc.) and so forth.

In this example, a light source 430 (e.g., a flashlight, etc.) is placed over the camera by a distance such that the received light at the camera 410 is not uniform. The mobile terminal 400 captures the image of the user environment, extracts luminance data from the captured image, and generates a light map representing the light cast from the light source 430. The mobile terminal 400 then generates a scene corresponding to the light map and renders the scene.

As illustrated in FIG. 4A, because the light source 430 is closer to the top left region of the display, the scene is rendered such that the rendered scene appears based on the user's environment. In this case, because the light source 430 is disposed over the 3D elements 420 in the left region of the display, the boxes on the left region of the display do not substantially cast a shadow to their left or right. However, boxes in the right region of the display will cast a shadow with respect to the light source 430 (i.e., to the right). Thus, the each of the 3D elements 420 will cast a unique shadow according to the distance and angle from the light source 430. Moreover, because this is performed substantially in real time, the user is able to perceive the user interface so that it feels more natural.

As illustrated in FIG. 4B, if the light source 430 is moved to the right region of the display, the 3D elements 420 in the right region will not cast a shadow to the right or left. However, the boxes in the left region will cast a shadow based on the position of the light source 430 (i.e., to the left).

Thus, as illustrated in FIGS. 4A and 4B, the application receives an image of the user's environment, renders a scene according to the user's environment, and displays the rendered scene. In such an example, different elements of the user interface in the mobile terminal 400 can be rendered such that the user interface elements provide a visual feedback to enhance the user interface. This allows the user to perceive the user interface elements as being more realistic and more natural.

FIGS. 5A, 5B, 5C, and 5D are illustrations of another implementation of the example process of FIG. 3.

Figure 5A:
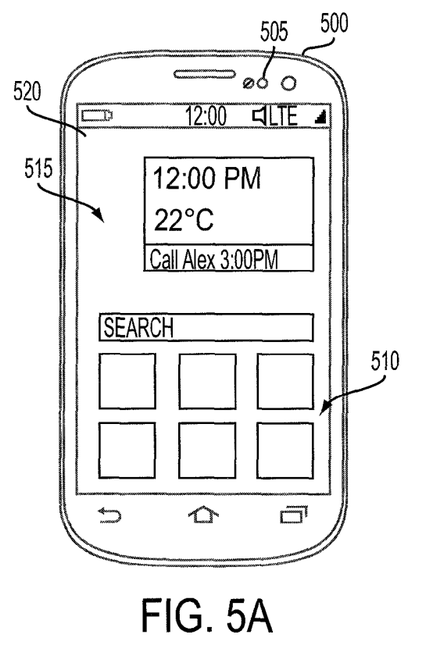
FIGS. 5A, 5B, 5C, and 5D are illustrations of another implementation of the example process of FIG. 3 according to an embodiment of the present disclosure.

Referring to FIG. 5A, a mobile terminal 500 with a forward facing camera 505 is activated to display an initial screen for operating the mobile terminal. The initial screen in FIG. 5A may be referred to as a home screen or a main screen that is generally displayed by default on the mobile terminal 500. In the example of FIG. 5A, the initial screen includes icons 510 configured to execute various applications, widgets 515 configured to provide information and other functions (e.g., time, calendar information, social network service information, search, etc.), and a background scene 520 that is displayed under the icons and widgets. For example, as illustrated in FIG. 5A, the background scene 520 is a solid color for the purposes of illustration.

Figure 5B:
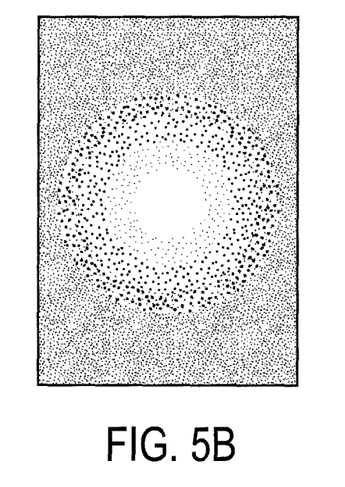
Figure 5C:
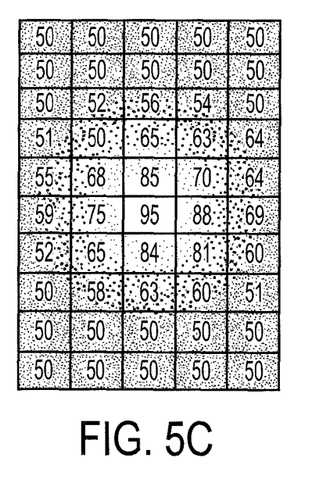

The mobile terminal 500 may use the user's environment to render the background scene 520. For example, if the camera 505 is placed such that a forward facing camera is pointed to a ceiling light, the camera 505 captures an image with the light as illustrated in FIG. 5B. Referring to FIG. 5C, the luminance channel is extracted from the captured image to create a luminance image. The luminance image is then segmented into a 5×10 array and an average luminance is computed for each of the cells in the array, which is illustrated in each cell in FIG. 5C. As noted above, the luminance map may be used to create ambient lights for the scene and may also be used to create a spot light for the scene by the segmented luminance map. In other examples, the luminance image may be used to create the spot light. Yet in other examples, the spot light may be created by analyzing shadows of the luminance image and edges of the captured image. In such an example, the spot light would be pointed at an angle with respect to the analyzed shadows and edges.

Figure 5D:
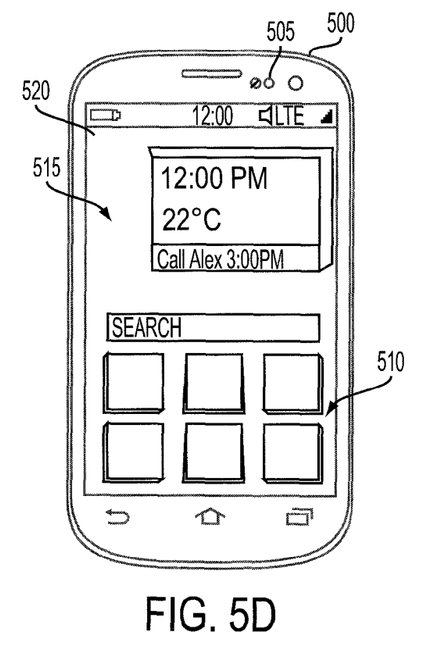

Referring to FIG. 5D, the initial screen 505 may be rendered according to the user's environment and based on auxiliary information. As illustrated in FIG. 5D, the icons 510 may cast a shadow according to the spot light created from the luminance map. Further, the ambient light associated with the luminance map may affect the display of the icons 510 and the background scene 505.

Further, as previously noted, auxiliary information associated with the environment may also be used. For example, the mobile terminal 500 may receive weather information and adjust the background accordingly. If the current weather is raining at the user's location, a saturation effect may be applied to the background image to create an impression that it is raining.

In other examples, the rendering can be provided in the context of a virtual reality or an augmented reality. For example, in an augmented reality, actual environmental information is augmented with virtual information. As an example, a camera of the mobile terminal 500 may create a digital image of an environment with a camera and augment the digital image with additional digital information that is not physically present. For example, a virtual item can be superimposed onto the digital image such that the virtual item appears to be present in digital image. The mobile terminal 500 may use the user's environment as disclosed above to render the virtual item into the digital image such that the user can approximate the virtual item's affect in the user's environment.

For example, the mobile terminal 500 may include a function to allow a user to add a virtual item, whereby the virtual item is a digital approximation of a physical item that can be purchased, into an image to approximate how the actual item would appear. However, such physical items may affect the lighting, for example. By using the user's current environment to create a rendered scene, the rendered scene should more accurately represent how the physical item would appear in the user's environment and affect the lighting, for example.

In another example, in a virtual reality that provides full head tracking and positional tracking for a fully immersive experience, the rendering can also be provided in the context of the user's environment. For example, an empty commercial space can be populated by virtual items in and the virtual items can be rendered to more accurately simulate the final appearance of the commercial space, thereby allowing a designer to more accurately model and simulate the commercial space as if present with the virtual items. In such an example, the mobile terminal 500 may use a combination of sensors to provide accurate positioning and orientation to facilitate the rendering of the scene to the user. In other examples, auxiliary devices that can communicate with the mobile terminal may provide contextual information with regard to the current environment to more accurately render the scene. For example, a headset that performs a communication function with respect to the user may include a light sensor that may detect ambient light levels.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for generating a display screen in a mobile terminal, the method comprising:
   receiving a scene to render of an application being executed by the mobile terminal;
   capturing an image of a current environment from a camera of the mobile terminal while executing the application;
   extracting information from the captured image;
   processing the extracted information;
   creating supplementary scene rendering information based on the processed information;
   rendering a display screen based on the received scene, the supplementary scene rendering information, and the extracted information; and
   displaying the rendered display screen during execution of the application, thereby creating a user interface for the mobile terminal comprising at least one three-dimensional (3D) element,
   wherein the user interface is configured to operate the rendered application.

2. The method of claim 1, wherein the extracting of the information from the captured image comprises extracting a luminance channel from the captured image.

3. The method of claim 2, wherein the processing of the extracted information comprises:
   dividing the luminance channel into an N×M matrix; and
   creating an average luminance for each cell in the N×M matrix.

4. The method of claim 3, wherein the rendering of the display screen comprises:
   determining whether a bright spot on the captured image exists by analyzing at least one of the captured image, the luminance channel, and the N×M matrix;
   creating a light source in the supplementary scene rendering information where the bright spot is determined; and
   creating N×M ambient light sources corresponding to each cell of the N×M matrix in the supplementary scene rendering information.

5. The method of claim 4,
   wherein the creating of the N×M ambient light sources comprises determining a color temperature and a light intensity of each cell of the N×M matrix, and
   wherein each of the N×M ambient light sources include the determine color temperature and light intensity.

6. The method of claim 4, wherein the creating of the light source in the supplementary scene rendering information comprises:
   determining a light intensity of the bright spot;
   determining a distance from the bright spot to the scene to display; and
   determining a color temperature of the bright spot,
   wherein the created light source is positioned according to the distance, the color temperature, and the light intensity.

7. The method of claim 1,
   wherein each of the at least one 3D elements comprise a reflective material, and
   wherein the captured image is filtered according to the reflective materials and the filtered image is applied to each of the at least one 3D elements.

8. The method of claim 1, wherein the executing of the application on the mobile terminal comprises displaying a home screen.

9. The method of claim 1,
   wherein the executing of the application on the mobile terminal comprises executing a supplemental application on the mobile terminal, and
   wherein the supplemental application is provided by one of the mobile terminal carrier and a third party application source.

10. A mobile terminal for generating a display screen in a mobile terminal, the mobile terminal comprising:
    a processor configured to receive a scene to render of an application being executed by the mobile terminal;
    a camera configured to capture an image of the current environment from a camera of the mobile terminal while executing the application; and
    a display configured to display a rendered display screen,
    wherein the processor is further configured to:
      extract information from the captured image,
      process the extracted information,
      create supplementary scene rendering information from the processed data, and
      render, during the operation, the display screen based on the supplementary scene rendering information and the received scene, and according to the extracted information,
    wherein the display configured to display the rendered display screen during the application, thereby creating a user interface comprising at least one three-dimensional (3D) element, and wherein the user interface is configured to operate the rendered application.

11. The mobile terminal of claim 10, wherein the processor is configured to extract a luminance channel from the captured image.

12. The mobile terminal of claim 11, wherein the processor is configured to:
divide the luminance channel into an N×M matrix, and
create an average luminance for each cell in the N×M matrix.

13. The mobile terminal of claim 12, wherein the processor is configured to:
determine whether a bright spot on the captured image exists by analyzing at least one of the captured image, the luminance channel, and the N×M matrix, and
create a light source in the supplementary scene rendering information where the bright spot is determined, and
create an N×M ambient light sources corresponding to each cell of the N×M matrix in the supplementary scene rendering information.

14. The mobile terminal of claim 13,
wherein the processor is configured to determine a color temperature and a light intensity of each cell of the N×M matrix, and
wherein each of the N×M ambient light sources include the determine color temperature and light intensity.

15. The mobile terminal of claim 13, wherein the processor is configured to:
determine a light intensity of the bright spot,
determine a distance from the bright spot to the scene to display, and
determine a color temperature of the bright spot, wherein the created light source is positioned according to the distance, the color temperature, and the light intensity.

16. The mobile terminal of claim 10,
wherein each of the at least one 3D elements comprise a reflective material, and
wherein the processor filters the captured image is filtered according to the reflective materials and applies the filtered image is applied to each of the at least one 3D elements.

17. The mobile terminal of claim 10,
wherein the executing of the application on the mobile terminal comprises at least one of displaying a home screen and executing a supplemental application on the mobile terminal, and
wherein the supplemental application is provided by one of the mobile terminal carrier and a third party application source.

18. At least one non-transitory processor readable medium for storing a computer program of instructions configured to be readable by at least one processor for instructing the at least one processor to execute a computer process for executing a method comprising:
receiving a scene to display an application being executed by the mobile terminal;
capturing an image of the current environment from a camera of the mobile terminal while executing the application;
extracting information from the captured image;
processing the extracted information;
creating supplementary scene rendering information based on the processed information;
rendering a display screen based on the received scene, the supplementary scene rendering information, and the extracted information; and
displaying the rendered display screen during the application, thereby creating a user interface comprising at least one three-dimensional (3D) element,
wherein the user interface is configured to operate the rendered application.

* * * * *